US010736713B2

United States Patent
Bierbaum et al.

(10) Patent No.: US 10,736,713 B2
(45) Date of Patent: Aug. 11, 2020

(54) DENTAL HANDPIECE HAVING A ROLLING BEARING

(71) Applicant: DENTSPLY SIRONA Inc., York, PA (US)

(72) Inventors: Thomas Bierbaum, Bensheim (DE); Matthias Rein, Lorsch (DE); Ralf Sutter, Weinheim (DE); Siegfried Goisser, Einhausen (DE)

(73) Assignee: DENTSPLY SIRONA INC., York, PA (US)

( * ) Notice: Subject to any disclaimer, the term of this patent is extended or adjusted under 35 U.S.C. 154(b) by 67 days.

(21) Appl. No.: 16/016,056

(22) Filed: Jun. 22, 2018

(65) Prior Publication Data

US 2018/0303578 A1 Oct. 25, 2018

Related U.S. Application Data

(63) Continuation of application No. 14/389,446, filed on Sep. 30, 2014, now abandoned.

(51) Int. Cl.
| | |
|---|---|
| *A61C 1/18* | (2006.01) |
| *F16C 33/58* | (2006.01) |
| *F16C 33/76* | (2006.01) |
| *F16C 25/08* | (2006.01) |
| *F16C 33/78* | (2006.01) |

(Continued)

(52) U.S. Cl.
CPC ............ *A61C 1/181* (2013.01); *F16C 25/083* (2013.01); *F16C 33/581* (2013.01); *F16C 33/583* (2013.01); *F16C 33/586* (2013.01); *F16C 33/767* (2013.01); *F16C 33/784* (2013.01); *F16C 35/042* (2013.01); *F16C 37/007* (2013.01); *A61C 1/0061* (2013.01); *A61C 1/052* (2013.01); *A61C 1/088* (2013.01); *F16C 19/06* (2013.01); *F16C 19/547* (2013.01); *F16C 33/768* (2013.01); *F16C 2316/13* (2013.01)

(58) Field of Classification Search
CPC .... F16C 25/083; F16C 33/581; F16C 33/583; F16C 33/586; F16C 33/767; F16C 33/784; F16C 33/768; F16C 35/042; F16C 37/007; F16C 19/06; F16C 19/547; F16C 2316/13
See application file for complete search history.

(56) References Cited

U.S. PATENT DOCUMENTS

| | | | | |
|---|---|---|---|---|
| 3,858,323 A | * | 1/1975 | Flatland | A61C 1/05 433/132 |
| 5,252,065 A | * | 10/1993 | Nakanishi | A61C 1/052 433/115 |
| 5,538,425 A | * | 7/1996 | Reeves | A61C 1/05 433/126 |

* cited by examiner

*Primary Examiner* — Heidi M Eide
(74) *Attorney, Agent, or Firm* — Dentsply Sirona Inc.

(57) ABSTRACT

A dental handpiece (1) having a drive (3) of a tool (4), which drive is located in a head housing (2), has at least one media-conducting line arranged in the head housing, which media-conducting line has an outlet opening to the tool, and a tool receptacle (16) arranged in a drive chamber, which tool receptacle is rotatably supported by means of a rolling bearing (11) in a support (14) of the head housing (2) on a side of the drive chamber facing the tool. The rolling bearing has an outer race (13), which is supported against the head housing (2) radially in the support (14) in the area of a raceway (22) and which has a sub-area (21), the outside diameter D2 of which is reduced compared to the outside diameter D1 in the area of the raceway (22). The head housing has a housing projection (23), which extends into (Continued)

the area of the reduced outside diameter D2, and the media-conducting line (17) runs at least partially through said housing projection (23).

8 Claims, 4 Drawing Sheets

(51) Int. Cl.
  *F16C 37/00* (2006.01)
  *F16C 35/04* (2006.01)
  *F16C 19/06* (2006.01)
  *F16C 19/54* (2006.01)
  *A61C 1/08* (2006.01)
  *A61C 1/00* (2006.01)
  *A61C 1/05* (2006.01)

DENTAL HANDPIECE HAVING A ROLLING BEARING

CROSS-REFERENCE

This is a continuation application of pending U.S. patent application Ser. No. 14/389,446, filed Sep. 30, 2014.

TECHNICAL FIELD

The invention relates to a dental handpiece or an angle piece having a drive for a tool situated in a head housing as well as at least one media-carrying line arranged in the head housing and having an outlet opening toward the tool and having a tool receptacle arranged in a drive chamber, said tool receptacle being supported on one side of the drive chamber facing the tool by means of a rolling bearing, so it can rotate in an abutment of the head housing.

PRIOR ART

EP 0 630 620 B1 discloses a dental turbine drive, in which the drive unit is secured in the head housing with O-rings and with vibration damping. In the outer race, the bearings have a shoulder with which the O-ring is in contact radially and on the transition of which the O-ring is supported axially.

DE 100 25 416 A1 discloses a dental handpiece in which an elastic radial support of a rotor shaft is provided by means of an O-ring and the elastic axial support is provided by means of a wave spring.

Disclosure of the Invention

The dental handpiece according to the invention has a drive for a tool, said drive being situated in a head housing, and at least one media-carrying line arranged in the head housing with an outlet opening toward the tool, and a tool receptacle, which is arranged in a drive chamber and is supported on one side of the drive chamber facing the tool by means of a rolling bearing, so that it can rotate in an abutment of the head housing. The rolling bearing has an outer race, which is supported radially against the head housing in the abutment in the region of a raceway and has a sub-area, whose outside diameter is reduced in comparison with the outside diameter in the region of the raceway. The head housing has a housing extension, which extends into the region of the reduced outside diameter, and the media-carrying line runs at least partially through this housing extension.

This has the advantage that the outlet opening of the media-carrying line can be carried closer to the tool without increasing the overall height and/or causing a reduction in the overall volume.

One advantageous refinement may consist of the outer race being supported against the head housing so that it is axially displaceable and has a cover disk connected thereto, extending from the outer race in the direction of an inner race arranged on the tool receptacle, wherein a prestressing means acting in the axial direction is arranged between the cover disk and the head housing, acting with an axial prestress on the outer race by means of the cover disk such that the head housing has another housing extension connected to the first housing extension, this housing extension extending radially in the direction toward the longitudinal axis in comparison with the outer race on its end, which supports the cover disk, and the media-carrying line also runs at least partially through this second housing extension.

This has the advantage that even in the event of an axial prestressing means of the bearing, the overall height need not be increased and, in particular, space is created for cooling equipment such as a spray.

The outside diameter of the extension may, in particular, be reduced in comparison with the outside diameter in the region of the raceway by an amount t1 of 0.1 mm to 0.5 mm, preferably 0.2 to 0.3 mm. The outside diameter is thus reduced by 0.2 mm-1.0 mm, preferably by 0.4 mm-0.6 mm, in the region of the extension in comparison with the outside diameter in the region of the raceway.

It has been found that such a reduction already results in an improvement in manufacturability and placement of the outlet opening of the media-carrying line.

In addition, it may be advantageous if the outer race is supported against the head housing such that it is axially displaceable and has a cover disk connected to it, which extends from the outer race in the direction of an inner race arranged on the tool receptacle such that a prestressing means acting in the axial direction is arranged between the cover disk and the head housing and acts upon the outer race with an axial prestress by way of the cover disk such that the cover disk has an extension extending in the axial direction and forming a sealing gap on its inside with the inner race and its outside is designed as an axial guide for the prestressing means.

BRIEF DESCRIPTION OF THE DRAWINGS

The inventive handpiece will now be explained with reference to the drawings, in which.

EMBODIMENT(S) OF THE INVENTION

Figure 1:
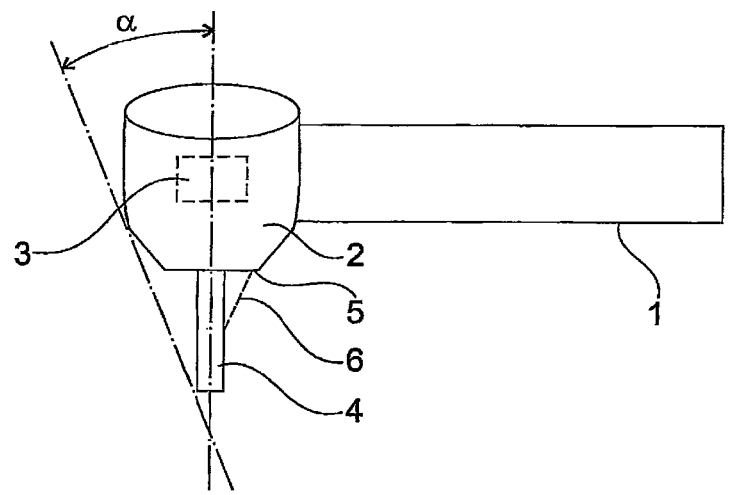
FIG. 1 shows a dental handpiece having a media-carrying line in the form of a spray according to the prior art.

FIG. 1 shows a dental handpiece 1, which has a head housing 2 with a drive 3 in the form of a turbine or a gear shaft for a treatment tool 4. To cool the tool 4 or to illuminate the location being treated with the tool, an outlet 5 for a water stream 6 or for an air stream or beam of light is provided in the head housing 2. In the event that water, air or light is used as the medium, this outlet location 5 should be as close to the tool 4 as possible in order to reduce shadows of the water jet or of the beam of light and to improve the illumination or cooling, in particular when working in tight cavities. The angle of viewing a is given in relation to a longitudinal axis 18 in accordance with Standard DIN/EN/ISO 7785-1.

Figure 2:
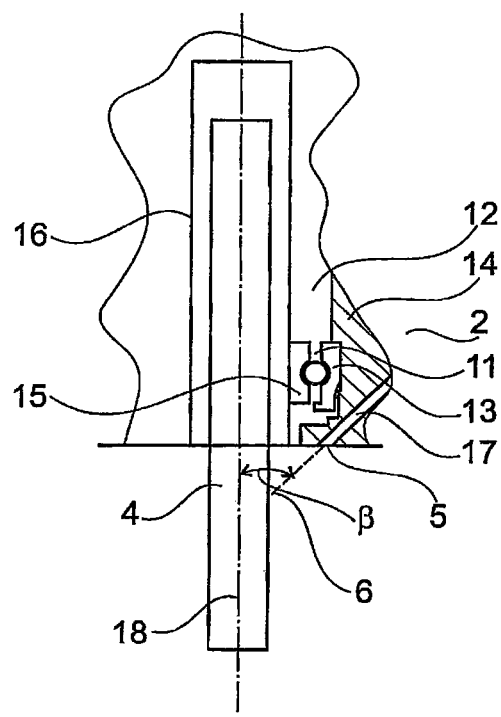
FIG. 2 shows a section from FIG. 1 of a head housing in the region of a tool having an inventive design of the rolling bearing and of the head housing.

The tool 4 is set in rotation by means of the drive 3, so that, as shown in FIG. 2, it is supported against the head housing 2 by means of a rolling bearing 11. The rolling bearing 11 is arranged in a drive chamber 12 and comprises an outer ring 13, which is supported radially against the head housing 2 in an abutment 14. The inner race 15 of the rolling bearing 11 is arranged on a tool receptacle 16 in which the tool 4 is secured. Even this diagram shows that the head housing has a media-carrying line 17, which leads to the outlet opening 5 and is designed as a straight-line bore because of the manufacturing process. The line 17 is inclined by an angle β with respect to the longitudinal axis 18 of the treatment tool 4, such that, in the present case, the direction of the emerging stream 6 corresponds to this angle β.

Figure 3:
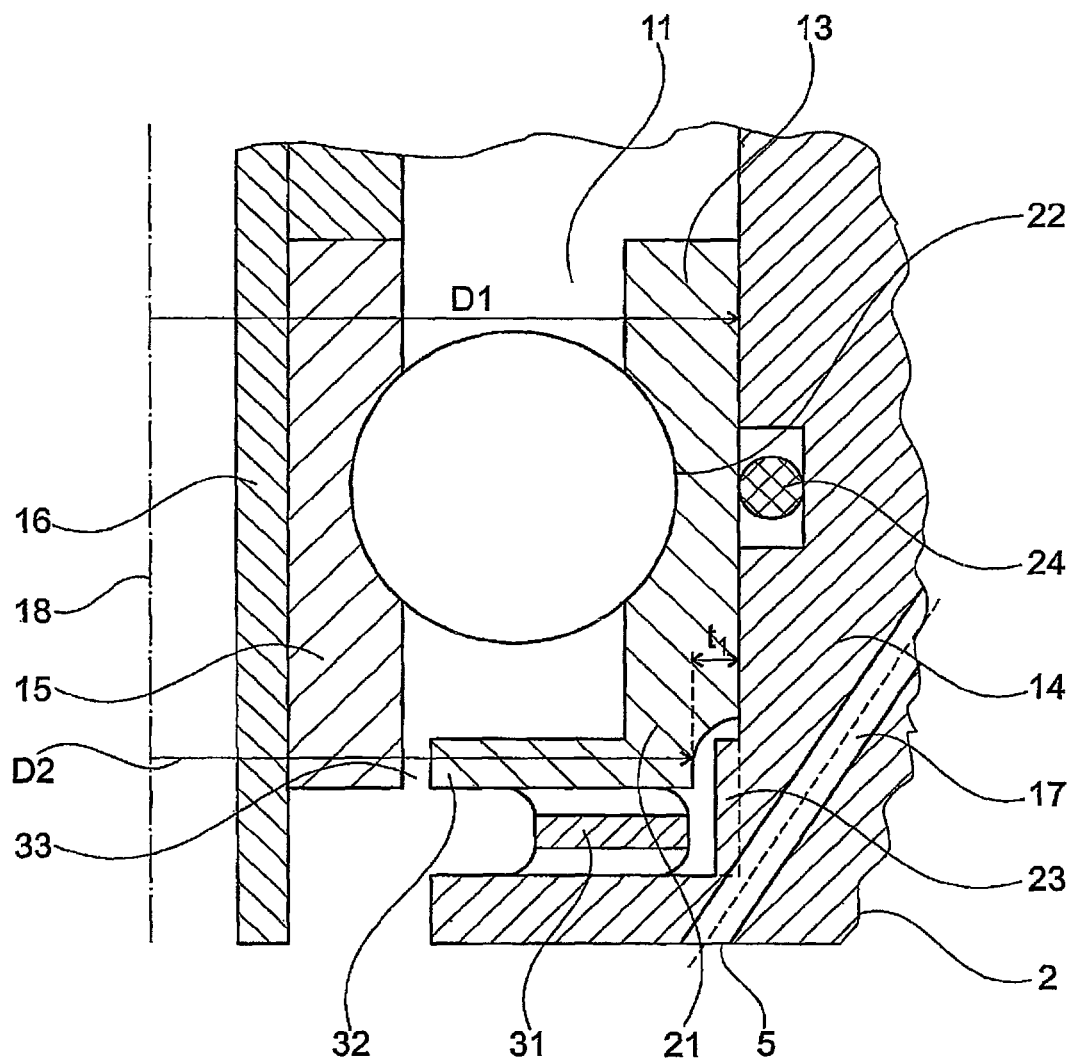
FIG. 3 shows an enlargement from FIG. 2 in the region of the support of the tool in the head housing.

FIG. 3 illustrates the special embodiment of the head housing 2 in the region of the abutment 14. This shows that the outer race 13 of the rolling bearing 11 has a sub-area 21, the outside diameter D2 of which is reduced by a double amount t1 in comparison with the outside diameter D1 in the region of the raceway.

In addition, in the region of the abutment 14, the head housing 2 has a housing extension 23, which extends into the region of the reduced outside diameter of the outer race and passes at least partially through the media-carrying line 17. This is indicated by the dashed continuation of the abutment without the housing extension 23. It is clear here that the line 17 would be open into the abutment itself if there were an abutment without an extension so that fluid could emerge here.

The projection 23 thus makes it possible to bring the line 17 closer to the longitudinal axis 18 than would be possible without the projection. If the outlet opening is not so far away from the longitudinal axis, this has the advantage that the shadowing is reduced, vision is improved and the angle of viewing a according to Standard DIN/EN/ISO 7785-1 is smaller.

To support the outer race 13 against the head housing 2, an elastic O-ring 24, which is deformed with a prestressing force, may be provided in the region of the abutment 14, with the O-ring 24 lying at approximately the height of the raceway 22. Therefore, radial mobility of the rolling bearing and/or an equalization of the tolerance of the components relative to one another is/are made possible.

In the axial direction, the outer race is displaceable axially beyond the O-ring and may be supported by a prestressing spring 31, which is supported in the axial direction against the bottom side of the head housing 2.

To permit the prestressing means 31 to be supported on the outer ring [sic, outer race], the outer ring [sic, outer race] 13 may have a cover disk 32 connected to it in the sub-area 21. The cover disk 32 may extend up to an inner race arranged on the tool receptacle 16, forming an annular gap 33. A certain sealing of the rolling bearing can be achieved by means of this annular gap.

Figure 4:
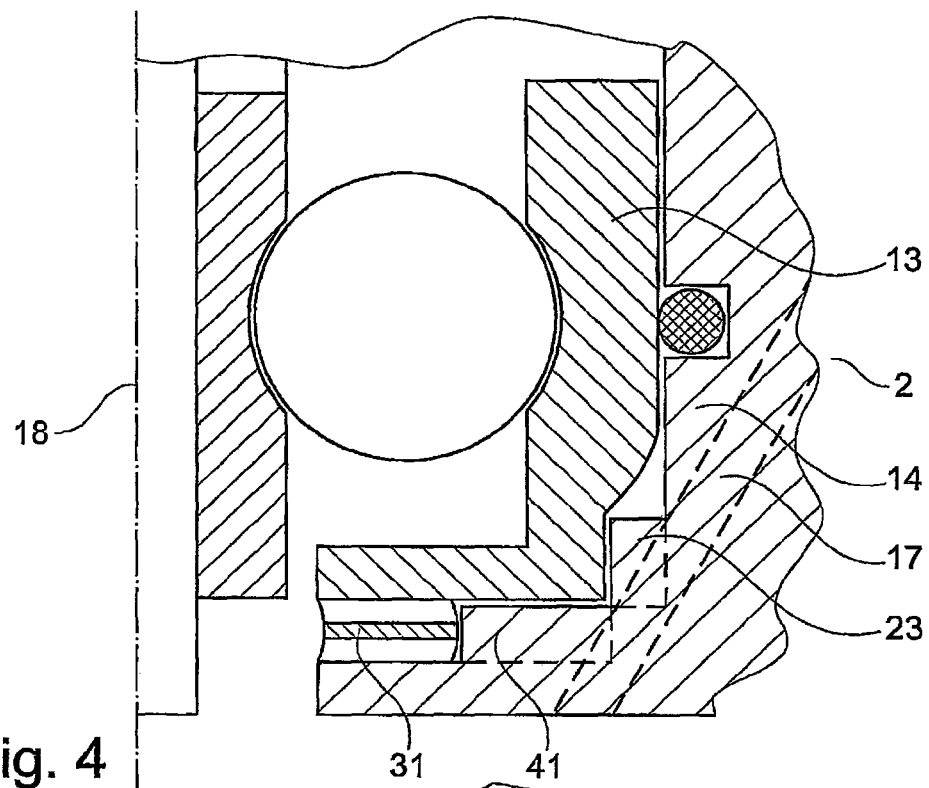
FIG. 4 shows an alternative design of the rolling bearing and of the head housing.
Figure 5:
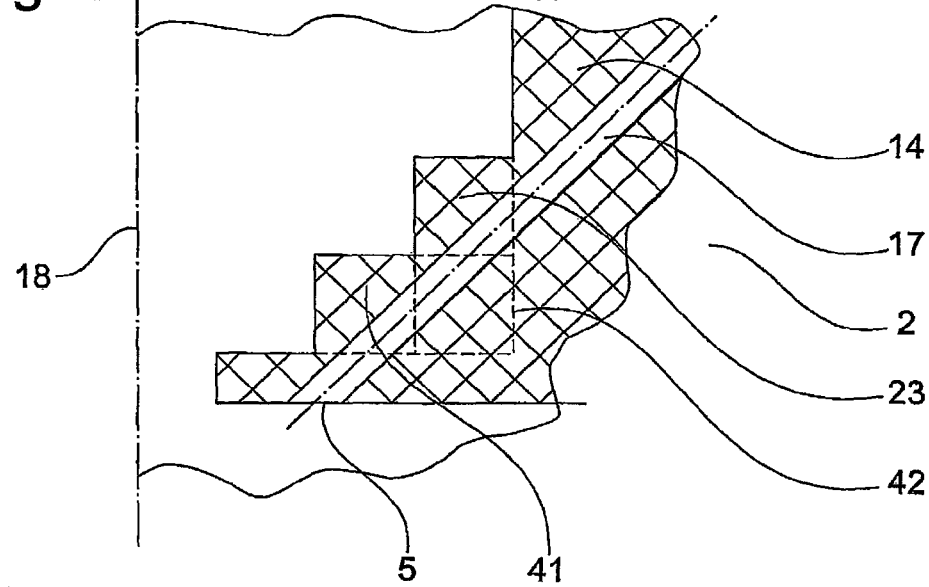
FIG. 5 shows the embodiment according to FIG. 4 in detail.

FIGS. 4 and 5 illustrate another exemplary embodiment, in which another housing projection is also provided in the region of the arrangement of the prestressing means in order to bring the media-carrying line even closer to the longitudinal axis. A slope can be provided (see FIG. 6 subsequently) instead of several steps.

In FIG. 4, the head housing 2 is provided with an additional projection 41 in the region of the abutment 14 for the outer race 13, in addition to the projection 23, with this additional projection extending in the radial direction to the longitudinal axis 18 beneath the outer race 13. Unlike the projection 23, the outer race 13 is not designed according to the projection 41, i.e., it does not take into account the projection 41. The outer race 13 of the bearing may also have a chamfer in the region of the projection 23, because no supporting functions are necessary here with respect to the housing.

The projection 41 limits the overall volume available for the prestressing means 31 and, at the same time, forms an axial stop for the outer race 13 and ensures that the prestressing means 31 will not be compressed completely and thereby damaged under the influence of the axial force via the outer race 13.

It can be seen that the line 17 can be brought even closer to the longitudinal axis 18 by the additional radial projection 41, which is also shown in the details of FIG. 5, in which the outer race and the prestressing means have been omitted from the diagram. The outlet location 5 of the line 17 can therefore be moved further toward the longitudinal axis 18 than would be the case if projection 23 or 41 were omitted, which is depicted by the dashed contour 42 in the abutment 14 of the head housing 2.

Figure 6:
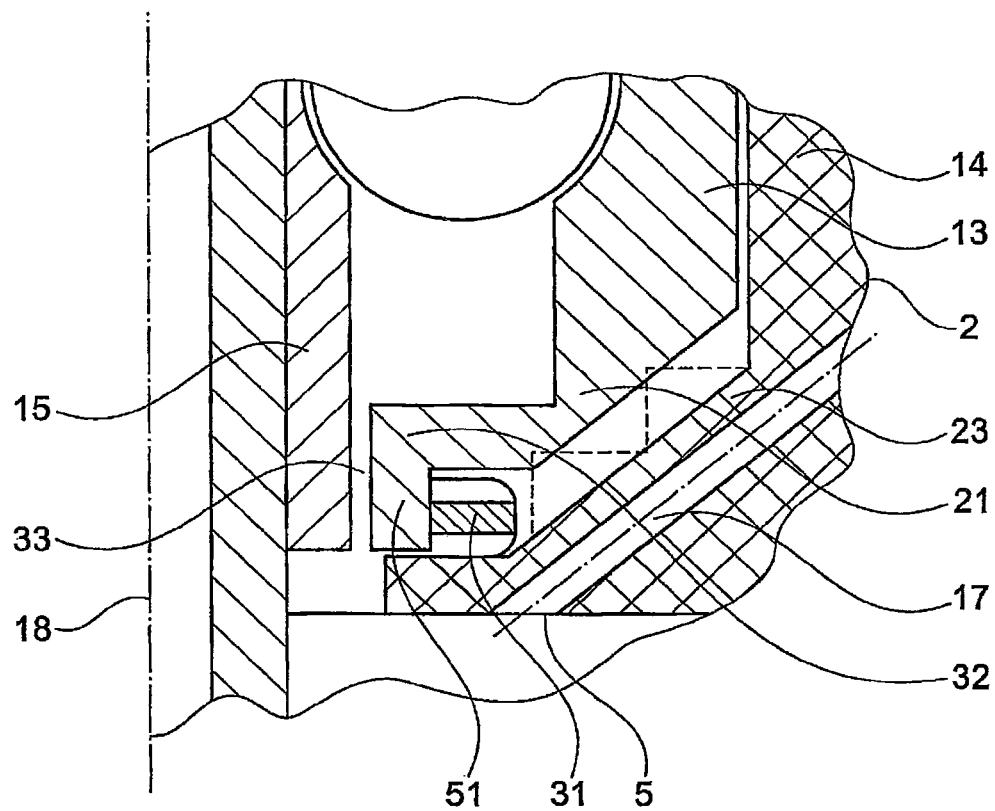
FIG. 6 shows another embodiment of the head housing.

FIG. 6 shows a head housing 2 with a housing projection 23, which extends obliquely into the region of the reduced outside diameter of the outer race 13, such that the outer race 13 also has an inclination. An axial continuation 51, which serves as a radial inside stop for the prestressing means in the form of a wave spring 31 and guides it axially, is provided on the end of the cover disk 32 facing the longitudinal axis 18. The gap 33 between the outer race 13 and the inner race 15 is therefore longer, so that the sealing effect is improved.

The inclined housing projection 23 again contains a line 17 with the outlet location 5. Since there is no longer an axial stop on the outer race 13 on this inclined projection, a stop on the outer race 13 with respect to the head housing is established by means of the continuation 51.

The invention claimed is:

1. A dental handpiece having a drive for driving a tool in a head housing, the head housing comprising,
    at least one media-carrying line arranged in the head housing and having an outlet opening toward the tool, and
    a tool receptacle arranged in a drive chamber, said tool receptacle is supported so that the tool receptacle rotates via a rolling bearing in an abutment of the head housing on a side of the drive chamber facing the tool, the rolling bearing has an outer race that is supported against the head housing radially in the abutment in a region of a raceway, the outer race has a sub-area, the outside diameter D2 of which is reduced in comparison with the outside diameter D1 in the region of the raceway,
    wherein the head housing has a first housing projection that extends into a region of the reduced outside diameter D2, and that the media-carrying line runs at least partially through the first housing projection,
    wherein the outer race is supported such that it is axially displaceable against the head housing, the outer race having a cover disk connected to it, said cover disk extending from the outer race in a direction of an inner race arranged on the tool receptacle, wherein a bias device acting in an axial direction is arranged between the cover disk and an extension of the head housing, with the bias device acting upon the outer race with an axial prestress by way of the cover disk, wherein the head housing has a second housing projection connected to the first housing projection, said second housing projection is different from the extension of the head housing upon which the bias device is arranged, the second housing projection extending radially beneath the cover disk in a direction towards a longitudinal axis of the tool, and wherein the media-carrying line runs at least partially through the second housing projection.

2. The dental handpiece according to claim 1, wherein an outer diameter D2 of the projection is less than an outer diameter D1 in the region of the raceway by an amount of 0.2 mm to 1.0 mm.

3. The dental handpiece according to claim 1 wherein an outer diameter D2 of the projection is less than an outer diameter D1 in the region of the raceway by an amount of 0.4 mm to 0.6 mm.

4. The dental handpiece according to claim 1, wherein the second housing projection is configured to limit a volume of the bias device in the direction of the inner race and forms an axial stop for the outer race.

5. A dental handpiece having a drive for driving a tool in a head housing, the head housing comprising:
 at least one media-carrying line arranged in the head housing and having an outlet opening toward the tool, and
 a tool receptacle arranged in a drive chamber, said tool receptacle is supported so that the tool receptacle rotate via a rolling bearing in an abutment of the head housing on a side of the drive chamber facing the tool, the rolling bearing has an outer race that is supported against the head housing radially in the abutment in a region of a raceway, the outer race has a sub-area, the outside diameter D2 of which is reduced in comparison with the outside diameter D1 in the region of the raceway,
 wherein the head housing has a first housing projection that extends into a region of the reduced outside diameter D2, and that the media-carrying line runs at least partially through the first housing projection,
 wherein the outer race has a cover disk connected to it extending from the outer race in the direction of an inner race arranged on the tool receptacle, wherein a bias device that acts in the axial direction is arranged between the cover disk and the head housing, with said bias device acting upon the outer race with an axial prestress via the cover disk, wherein the cover disk has a continuation that extends in the axial direction and said continuation forms a sealing gap on a side with an inner race of the rolling bearing, said side faces the inner race of the rolling bearing and is parallel to a longitudinal axis of the tool, and an outside of the cover disk is designed as an axial guide for the bias device.

6. The dental handpiece according to claim 5, wherein the sub-area of the outer race tapers conically, and the first housing projection of the head housing also tapers conically and the media-carrying line runs in this housing projection.

7. The dental handpiece according to claim 5, wherein an outer diameter D2 of the projection is less than an outer diameter D1 in the region of the raceway by an amount of 0.2 mm to 1.0 mm.

8. The dental handpiece according to claim 5, wherein an outer diameter D2 of the projection is less than an outer diameter D1 in the region of the raceway by an amount of 0.4 mm to 0.6 mm.

* * * * *